United States Patent [19]  [11] 4,391,962
Schreurs et al.  [45] Jul. 5, 1983

[54] PROCESS FOR THE SUSPENSION (CO)POLYMERIZATION OF VINYL CHLORIDE

[75] Inventors: Petrus H. M. Schreurs, Deventer; Willem F. Verhelst, Gorssel, both of Netherlands

[73] Assignee: Akzona Incorporated, Asheville, N.C.

[21] Appl. No.: 208,616

[22] Filed: Nov. 20, 1980

[30] Foreign Application Priority Data

Nov. 30, 1979 [NL] Netherlands ......................... 7908674

[51] Int. Cl.³ ........................ C08F 2/20; C08F 14/06
[52] U.S. Cl. .................................. 526/200; 526/202; 526/210
[58] Field of Search ............... 526/202, 200, 210, 211, 526/344.2

[56] References Cited

U.S. PATENT DOCUMENTS 3,817,963  6/1974  Balwe .................................. 526/200

OTHER PUBLICATIONS

Chem. Abst., 81, 64,655(x) (1974).

*Primary Examiner*—C. A. Henderson
*Attorney, Agent, or Firm*—Francis W. Young; Robert F. Green

[57] ABSTRACT

An improved process for the suspension polymerization of vinyl chloride in the presence of a radical initiator and at least two suspension stabilizers is disclosed. The improvement comprises performing the polymerization in the presence of at least one primary stabilizer selected from the group consisting of water-soluble partially hydrolyzed polyvinyl acetates and methyl hydroxypropyl cellulose and at least one secondary stabilizer selected from the group consisting of N-alkyl gluconamides wherein the alkyl group contains from about 16 to about 20 carbon atoms.

5 Claims, No Drawings

PROCESS FOR THE SUSPENSION (CO)POLYMERIZATION OF VINYL CHLORIDE

BACKGROUND OF THE INVENTION

This invention relates to a process for the suspension (co)polymerization of vinyl chloride in the presence of a radical initiator and at least two suspension stabilizers.

The suspension polymerization of vinyl chloride is generally known in the art. One may, for example, refer to British Pat. Nos. 1,524,492 and 1,541,386. The two patent specifications describe the use of a water-soluble polyvinyl alcohol in combination with a partially hydrolyzed polyvinyl acetate which is itself only poorly soluble or insoluble in water. Also, as a pure product, the partially hydrolyzed polyvinyl acetate is generally difficult to handle. Thus, in actual practice, such a suspension stabilizer has been mostly used as a solution in methanol. However, for some applications, the presence of methanol is not desirable.

British Pat. No. 1,543,431 describes a stabilizer system for the polymerization of vinyl chloride which is a combination of a methyl hydroxypropyl cellulose and a polyvinyl alcohol which has an acetate content of 61.5 to 70.5% by weight.

SUMMARY OF THE INVENTION

There has now been discovered an improved process for the suspension polymerization of vinyl chloride in the presence of a radical initiator and at least two suspension stabilizers. The improvement comprises performing the polymerization in the presence of at least one primary stabilizer selected from the group consisting of water-soluble partially hydrolyzed polyvinyl acetates and methyl hydroxypropyl cellulose and at least one secondary stabilizer selected from the group consisting of N-alkyl gluconamides wherein the alkyl group contains from about 16 to about 20 carbon atoms.

DETAILED DESCRIPTION OF THE PREFERRED EMBODIMENTS

The stabilizers which are utilized in the present invention all possess satisfactory handling characteristics. Moreover, the use of the desired combination of primary and secondary stabilizers results in obtaining a polymer or (co)polymer having a very small number of fish eyes. Furthermore, it has been observed that partial replacement of only the primary stabilizer with the present N-alkyl gluconamide leads to a substantial increase in plasticizer absorption, without resulting in an appreciable decrease in the bulk density of the resulting polymer or (co)polymer.

The process of the present invention may be used for the preparation of polyvinyl chloride by the suspension polymerization of vinyl chloride and for the preparation of vinyl chloride (co)polymers by causing the polymerization to take place in the presence of other ethylenically unsaturated monomers capable of being polymerized with vinyl chloride. Thus, the terms polymerize and polymerization are used in this specification and the appended claims to encompass both a homopolymerization of vinyl chloride and a copolymerization of vinyl chloride with such other ethylenically unsaturated monomers. Examples of suitable monomers which may be copolymerized with a vinyl chloride include vinylidene chloride; vinylidene fluoride; esters of acrylic acid, such as methyl acrylate, ethyl acrylate, butyl acrylate, octyl acrylate, cyanoethyl acrylate and the like; esters of methacrylic acid, such as methyl methacrylate, ethyl methacrylate, butyl methacrylate and the like; styrene and styrene derivatives such as methyl styrene, vinyl toluene, chlorostyrene and the like; acrylonitrile; ethyl vinyl benzene; vinyl naphthalene and the like; dialkenes such as butadiene, isoprene, chloroprene and the like; and other vinylidene monomers.

The process of the present invention is performed in an aqueous medium, preferably demineralized water. A typical monomer to water ratio is in the range of about 1:1 to about 1:3, preferably about 1:1.3 to about 1:2.

The polymerization in the present invention is performed in the presence of radical generating catalysts which are well known in the art. Suitable catalysts include: organic peroxides, such as dibenzoyl peroxide, dilauroyl peroxide, 2,4-dichlorobenzoyl peroxide; peresters, such as tertiary butyl peracetate, tertiary butyl peroctoate, tertiary butyl perneodecanoate, tertiary butyl perpivalate; dialkyl peroxydicarbonates, such as diisopropyl peroxydicarbonate, diethyl peroxydicarbonate, dicyclohexyl peroxydicarbonate, diethyl cyclohexyl peroxydicarbonate, dicetyl peroxydicarbonate, dimyristyl peroxydicarbonate, ditertiary butyl cyclohexyl peroxydicarbonate; azo compounds, sich as azodiisobutyro dinitrile, azo-bisdimethyl valero dinitrile; and mixed anhydrides of organic sulphoperacids and carboxylic acids, such as acetylcyclohexyl sulphonyl peroxide.

Of course, mixtures of radical generating catalysts may be employed. The catalyst concentration is usually in an amount from about 0.01 to about 0.3% by weight, preferably from about 0.01 to about 0.15%, by weight, based on the total amount of monomer.

As previously indicated, the present process is preformed in the presence of a primary and a secondary suspension stabilizer. The primary stabilizer is selected from the group consisting of water-soluble partially hydrolyzed polyvinyl acetates and methylhydroxypropyl cellulose. Preferably, the polyvinyl acetate which is utilized in the present invention is characterized in that the viscosity of a 4% aqueous solution at 20° C. is typically in the range from about 1 to about 100 centipoise, and preferably from about 72 to about 90 mole percent of the polyvinyl acetate is hydrolyzed. A typical commercial product meeting the aforementioned criteria is sold under the trademark Gohsenol GH 20, marketed by Nippon Gohsei, having a viscosity in a 4% aqueous solution of from about 40 to about 46 centipoise, and being from about 87 to about 89 mole percent hydrolyzed, as well as the product sold under the trademark Gohsenol KP 08 which has a viscosity as a 4% aqueous solution from about 6 to about 9 centipoise, and being from about 71 to about 75 mole percent hydrolyzed.

An example of a suitable methylhydroxypropyl cellulose is a product marketed by Dow Chemical under the trademark Methocel F 50. One may also employ mixtures of the aforementioned compounds as well as the aforementioned compounds in combination with other stabilizers which are known to be useful for such a purpose.

The primary stabilizers of the present invention are typically employed in an amount from about 0.005 to about 0.50%, by weight, based on the total weight of monomer. Preferably, the primary stabilizer is employed in an amount from about 0.01 to about 0.10%, by weight.

The secondary stabilizer which is utilized in the present invention is an N-alkyl gluconamide of the general formula:

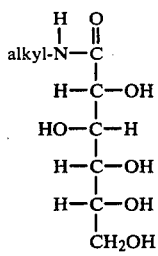

wherein the alkyl group contains about 16 to about 20 carbon atoms.

When the alkyl group in the N-alkyl gluconamide contains less than about 16 carbon atoms, the compound appears to have insufficient dispersing power. Conversely, when the N-alkyl gluconamide has an alkyl group containing more than about 20 carbon atoms, it appears to exhibit insufficient solubility in the aqueous medium, thus also effecting the dispersing power.

Of course, mixtures of the N-alkyl gluconamides which are useful in the present invention may be employed. It is preferred that N-octadecyl gluconamide be utilized as the secondary stabilizer. The amount of N-alkyl gluconamide to be employed is generally from about 0.01 to about 0.2%, by weight, preferably from about 0.02 to about 0.10%, by weight, based on the total weight of the monomer.

The polymerization which is employed in the present invention is performed in any manner customarily employed in the art. For example, as in conventional polymerization, autoclaves may be utilized at a temperature in the range from about 30° to about 75° C., preferably from about 40° to about 70° C.

The present invention will be further illustrated by means of the following non-limiting examples.

EXAMPLE I

Into a one-liter glass autoclave equipped with the usual accessories there were introduced: 170 g. water; 0.2 g. NaHCO$_3$; 0.033 g. Gohsenol KP 08 (a water soluble, partly hydrolyzed polyvinyl acetate) and 0.067 g. N-octadecyl gluconamide. The autoclave was evacuated and flushed 5 times with N$_2$ while kept at 20° C. There were added 0.077 g. dimyristyl peroxydicarbonate and 100 g. vinyl chloride and the temperature was raised to 55° C., with stirring at a speed of 750 r.p.m. After 7 hours polymerization the remaining monomer was removed, the suspension filtered off, washed with water and dried at 50° C. The results are summarized in Table I.

Comparative experiments were carried out in which in place of N-octadecyl gluconamide, the suspension stabilizers Gohsenol KP 08, Armotan ® MP (sorbitan monopalmitate), Armotan ® ML (sorbitan monolaurate) Tween ® 20 (polyoxyethylene (20) monolaurate) and Tween ® 21 (polyoxyethylene (4) monolaurate) were used. Only the results obtained with Tween ® 21 (polyoxyethylene (4) monolaurate) compared with those obtained with N-octadecyl gluconamide. When only Gohsenol KP 08 was used, the results obtained were distinctly poorer. In all other cases destabilization of the suspension was observed after 1 to 2 hours polymerization.

EXAMPLE II

Polyvinyl chloride was prepared in the same way as in Example I from 170 g. water; 0.2 g. NaHCO$_3$; 0.033 g. Gohsenol GH 20 (a water soluble, partially hydrolyzed polyvinyl acetate); 0.067 g. N-octadecyl gluconamide; 0.077 g. dimyristyl peroxy dicarbonate and 100 g. vinyl chloride. Table I shows the results obtained.

Comparative experiments were again carried out in which N-octadecyl gluconamide had been replaced with Gohsenol GH 20, Armotan ® (MP sorbitan monopalmitate), Tween ® 20 (polyoxyethylene (20) monolaurate) and Tween ® 21 (polyoxyethylene (4) monolaurate).

When Tween ® (polyoxyethylene (20) monolaurate) was used, the suspension was subject to destabilization within 1 to 2 hours. The results obtained with the other stabilizers are summarized in Table I and are distinctly inferior to those obtained with N-octadecyl gluconamide, particularly as far as plasticizer absorption and number of fish eyes are concerned.

EXAMPLE III

The procedure of Example I was repeated, but in such a way that Methocel F 50 methylhydroxypropyl cellulose was used instead of Gohsenol KP 08. For comparison an experiment was carried out in which as stabilizer only 0.1 g. Methocel F 50 was employed. The results are also summarized in Table I.

TABLE I

|  | Example 1 | | Example II | | | | Example III | |
|---|---|---|---|---|---|---|---|---|
|  | according to invention | for comparison | according to invention | for comparison | | | according to invention | for comparison |
| Gohsenol KP 08 | 0.033 | 0.100 | 0.033 | — | — | — | — | — |
| Gohsenol GH 20 | — | — | — | 0.033 | 0.100 | 0.033 | 0.033 | — | — |
| Methocel F 50 | — | — | — | — | — | — | — | 0.033 | 0.100 |
| N—octadecyl gluconamide | 0.067 | — | — | 0.067 | — | — | — | 0.067 | — |
| Armotan ® MP | — | — | — | — | — · | 0.067 | — | — | — |
| Tween ® 21 | — | — | 0.067 | — | — | — | 0.067 | — | — |
| Conversion (%) | 92 | 90 | 91 | 90 | 87 | 89 | 88 | 91 | 88 |
| Bulk density (g/cm$^3$) | 0.54 | 0.49 | 0.53 | 0.51 | 0.52 | 0.52 | 0.50 | 0.50 | 0.53 |
| Dry flow (g/s) | 4.5 | 4.3 | 4.1 | 4.1 | 4.7 | 4.3 | 4.0 | 4.2 | 4.8 |
| Plasticizer absorption (%)[1] | 24 | 21 | 25 | 26 | 11 | 17 | 19 | 22 | 14 |
| Mean particle size (μm) | 225 | 168 | 254 | 262 | 148 | 224 | 228 | 194 | 127 |
| Spread (%)[2] | 43 | 37 | 56 | 45 | 80 | 55 | 58 | 58 | 48 |
| Fish eyes (dm-2)[3] | 0 | 47 | 0 | 400 | 5900 | 1200 | 1600 | 0 | 110 |

[1] Determined in accordance with DIN 53417, p. 1 Centrifuging method
[2] Determined in accordance with ASTM D 1921-63; Method A
[3] Determined in accordance with O. Leucks, Kunststoffe 50(4) 1960, pp. 227-234

What is claimed is:

1. An improved process for suspension polymerizing vinyl chloride in the presence of a radical initiator and at least two suspension stabilizers wherein the improvement comprises polymerizing the vinyl chloride in the presence of at least one primary stabilizer selected from the group consisting of water-soluble, partially hydrolyzed polyvinyl acetates and methyl hydroxypropyl cellulose and at least one secondary stabilizer selected from the group consisting of N-alkyl gluconamide wherein the alkyl group contains from about 16 to about 20 carbon atoms.

2. The process of claim 1, in which the polymerization takes place in the presence of about 0.01 to about 0.2 percent by weight of N-alkyl gluconamide, calculated on the amount of monomer.

3. The process of claim 1 or 2, in which the N-alkyl gluconamide is N-octadecyl gluconamide.

4. The process of claim 1 or 2 wherein the vinyl chloride is homopolymerized.

5. The process of claim 1 or 2 wherein the vinyl chloride is copolymerized with another ethylenically unsaturated monomer.

* * * * *